United States Patent [19]

Ballantyne

[11] 4,123,640
[45] Oct. 31, 1978

[54] PUSH BUTTON TYPE SWITCH HAVING DEFORMABLE HOUSING SLEEVE FOR PERMANENT ATTACHMENT TO CONDUCTIVE PANEL

[75] Inventor: David B. Ballantyne, Southfield, Mich.

[73] Assignee: General Motors Corporation, Detroit, Mich.

[21] Appl. No.: 862,151

[22] Filed: Dec. 19, 1977

Related U.S. Application Data

[63] Continuation-in-part of Ser. No. 690,509, May 27, 1976, abandoned.

[51] Int. Cl.$^2$ ................. H01H 13/02; G12B 9/00
[52] U.S. Cl. ................. 200/296; 85/70; 200/61.76; 200/159 R; 248/27.3
[58] Field of Search .............. 200/61.76, 61.78, 61.79, 200/61.8, 61.81, 61.82, 159 R, 294, 295, 296; 248/27.1, 27.3; 74/502; 85/70, 71

[56] References Cited

U.S. PATENT DOCUMENTS

| | | | |
|---|---|---|---|
| 2,424,804 | 7/1947 | DeSwart | 85/71 X |
| 2,921,155 | 1/1960 | Basso | 200/159 R X |
| 3,024,336 | 3/1962 | Trafton | 200/296 X |
| 3,230,818 | 1/1966 | Siebol | 85/71 |
| 3,479,081 | 11/1969 | Schaaf | 85/71 |
| 3,560,690 | 2/1971 | Luce et al. | 200/295 |
| 3,674,970 | 7/1972 | Beddes | 200/295 |
| 3,778,755 | 12/1973 | Marks | 85/71 X |

*Primary Examiner*—Stephen Marcus
*Attorney, Agent, or Firm*—Charles E. Leahy

[57] ABSTRACT

An electrical switch includes a tubular body having a sleeve portion defining an axially extending bore and adapted for insertion into an aperture of a support such as a vehicle door framing member. An annular collar on the sleeve portion is engageable with the support to limit insertion of the sleeve portion into the support. A plunger assembly includes a plunger guide member supported within the bore and a plunger rod extending through the sleeve portion bore and the guide member. A head portion is provided on either the plunger rod or the guide member adjacent the end of the sleeve portion and is adapted to engage and cause axial collapse and radial expansion of the sleeve portion to mount the tubular body on the support. A coil compression spring encircles the plunger rod and acts to move the plunger rod axially and carry an electrical contact mounted thereon into switch closing engagement with the tubular body or the guide member. The plunger rod is adapted for engagement by the vehicle door to move the plunger rod against the spring bias and carry the electrical contact away from grounding engagement. The guide member may have a frictional interference with the tubular body so that an initial engagement by the door moves the guide member to an adjusted position.

5 Claims, 8 Drawing Figures

PUSH BUTTON TYPE SWITCH HAVING DEFORMABLE HOUSING SLEEVE FOR PERMANENT ATTACHMENT TO CONDUCTIVE PANEL

BACKGROUND OF THE INVENTION

This is a continuation-in-part of Ser. No. 690,509, filed May 27, 1976, now abandoned.

The invention relates to an operating plunger and mounting means therefore and more particularly to an improved mounting means and plunger for a door operated electrical switch.

It is known to provide a door operated switch having a spring biased plunger slidably mounted in a sleeve which is mounted on the door frame by a threaded fastener.

It is known in the fastener art to provide a blind rivet having a sleeve with a preformed head at one end. A pin extends through a bore of the sleeve and has a preformed head at one end and grooves in the other end for gripping by a pulling tool to cause axial collapse and radial expansion of the rivet.

According to this invention, a door operated electrical switch includes a tubular body having a sleeve portion defining an axially extending bore and an annular collar engageable with the support to limit insertion of the sleeve portion into the support. A guide member supports a plunger rod for reciprocable movement within the bore and carries a switch contact. In one embodiment of the invention the plunger rod is adapted for engagement by a tool which forcibly pulls a head portion of the plunger rod against the end of the tubular body sleeve portion to cause axial collapse and radial expansion of the sleeve portion to mount the tubular body on the support by capture of the support between the annular collar and the radially expanded sleeve portion. A coil compression spring encircles the plunger rod and acts to move the plunger rod axially and carry the switch contact mounted thereon into switch closing contact with the tubular body. The head portion of the plunger rod is adapted for engagement by the vehicle door to move the plunger rod against the spring bias and carry the switch contact to switch opening disengagement from the tubular body. In a second embodiment of the invention a guide member has a frictional interference fit with the bore of tubular body and has a head portion at one end which provides a switch contact for the plunger rod switch contact and which is forcibly engaged with the end of the sleeve portion upon pulling the other end of the guide member to axially collapse and radially expand the sleeve portion. Initial door closure actuates the plunger rod to carry the plunger rod switch contact away from the guide member head portion and move the guide member to an adjusted position wherein the head portion is positioned further from the support to limit the projection of the plunger rod beyond the support.

BRIEF DESCRIPTION OF THE DRAWINGS

These and other objects, features and advantages of the invention will become apparent upon consideration of the specification and the appended drawings in which.

DETAILED DESCRIPTION OF THE FIRST EMBODIMENT

Figure 3:
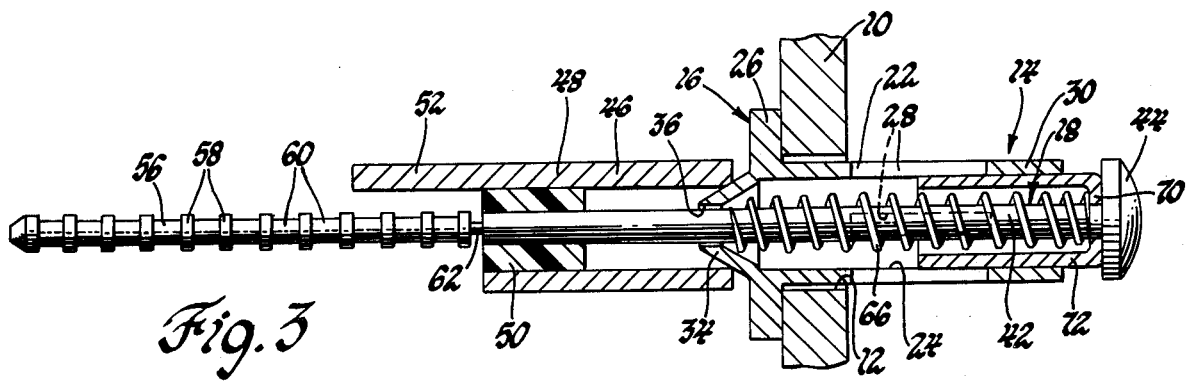
FIG. 3 shows the electrical switch prior to its being mounted on the support.

Referring to FIG. 3, it is seen that a support member or door frame 10 defines an aperture 12. A switch indicated generally at 14 is comprised of a body assembly designated 16 and a plunger assembly designated 18.

The body assembly 16 of the switch assembly 14 includes a sleeve portion 22 having an axially extending bore 24. An annular abutment collar 26 is integrally formed or suitably attached at one end of the sleeve portion 22 and is engageable against a face of the support member 10. The sleeve portion 22 has a plurality of circumferentially spaced axial incisions 28 which divide the sleeve portion 22 into a plurality of circumferentially spaced axially extending wall portions 30. The end of the sleeve portion 22 adjacent the abutment collar 26 is necked down to provide a conical seat 34 and an opening 36.

The plunger assembly 18 includes a plunger rod 42 having a head 44 at one end thereof and a swich contact 46 at the other end thereof. The swich contact 46 includes a tubular member 48 which is mounted on the plunger rod 42 by an annular plastic insulating ring 50. The tubular member 48 has an integral connector tang 52 which is adapted to mate with a conventional electrical connector. The plunger rod 42 has a shank portion 56 which extends outwardly of the tubular member 48 and has alternating lands 58 and grooves 60. The shank portion 56 is integrally connected to the plunger rod 42 by a break-away neck 62.

A coil compression spring 66 encircles the plunger rod 42 and has its one end seated against the necked-down end of the sleeve member at the conical seat 34. The other end of spring 66 seats against an inwardly turned end 70 of a guide member 72 which fits closely within the bore 24 of sleeve portion 22 to center the plunger rod 42 within the sleeve portion 22. The other end of plunger rod 42 is centered by the opening 36 of sleeve portion 22. As seen in FIG. 3, the spring 66 urges the guide member 72 and the plunger head 44 rightwardly to carry the tubular member 48 of the switch contact 46 into engagement of the conical seat 34.

Figure 4:
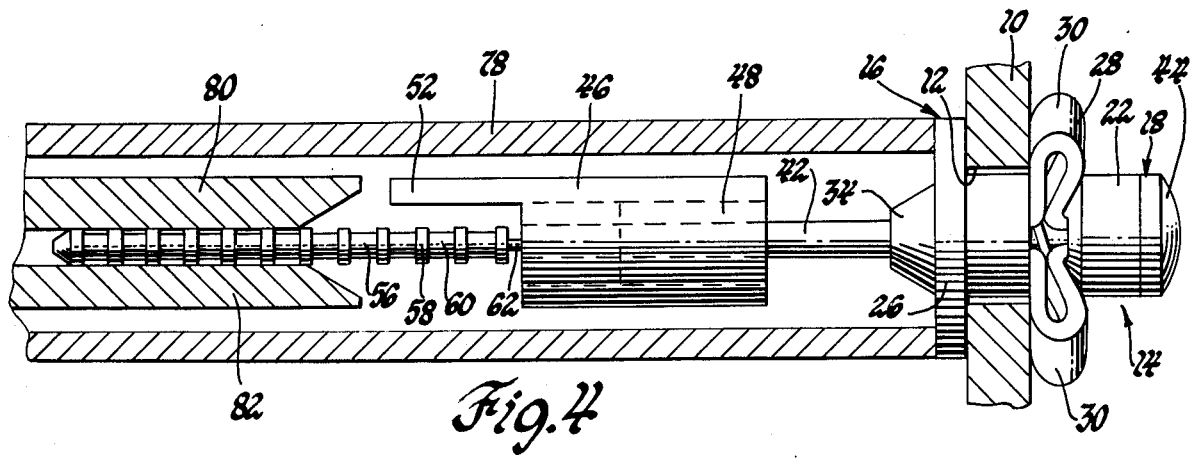
FIG. 4 shows how the electrical switch is mounted on the support member.

Comparing FIGS. 3 and 4, it will be seen that the switch assembly 14 is mounted on the support member 10 by collapsing the sleeve portion 22 axially which in turn causes radial expansion of the circumferentially spaced axial wall portions 30 as seen in FIG. 4.

As seen in FIG. 4, an assembly tool is fitted over the switch assembly 14 and includes a positioning sleeve 78 and circumferentially spaced gripping jaws 80 and 82. The positioning sleeve 78 seats against the abutment collar 26 to hold the abutment collar 26 in engagement with the face of support member 10. The jaws 80 and 82 are power operated for radially inward gripping and leftward movement of the shank portion 56. Leftward travel of the plunger rod 42 from its position of FIG. 3 carries the head 44 into engagement of the end of sleeve portion 22. Further leftward movement of the plunger rod 42 causes axial collapse of the sleeve portion 22. The circumferentially spaced axial incisions 28 weaken the sleeve portion 22 so that the circumferentially spaced axial wall portions 30 buckle outwardly in uniform manner to capture the support member 10 between the abutment collar 26 and the axial wall portions 30. The shank portion 56 breaks away from the plunger rod 42 at the break-away neck 62.

Figure 1:
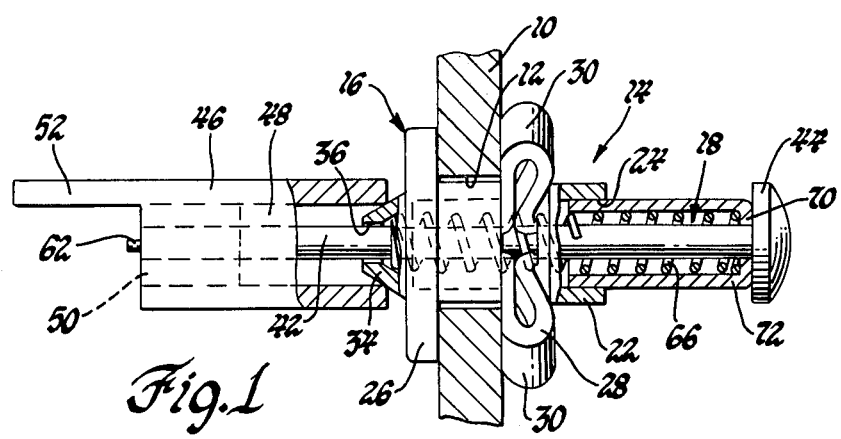
FIG. 1 is a sectional view of a first embodiment of the invention showing the electrical switch mounted on a vehicle body support and poised in the switch closed position when the vehicle door is in open position.

Referring to FIG. 1, the completed switch installation is shown. The spring 66 urges the plunger assembly 18 rightwardly to carry the switch contact 46 into electrical contact with the grounded switch contact provided by conical seat 34 of sleeve portion 22.

Figure 2:
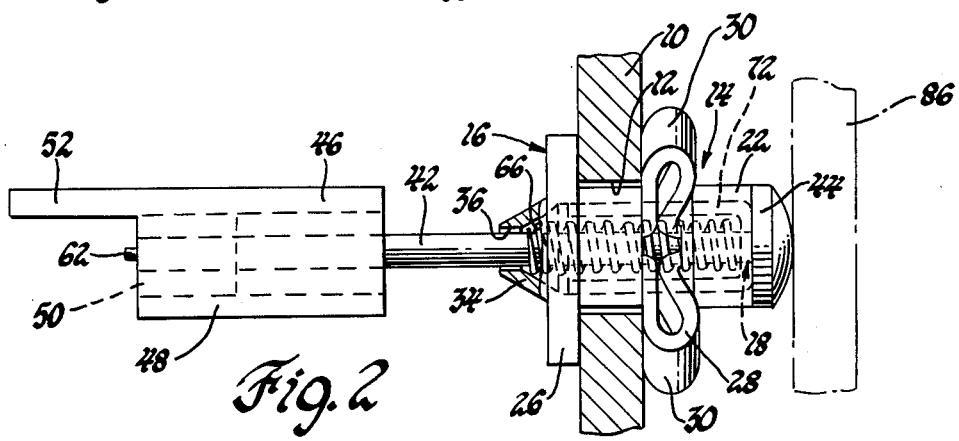
FIG. 2 is a view similar to FIG. 1 but showing the switch poised in the open position when the vehicle door is in its closed position.

Referring to FIG. 2, the switch assembly 14 is shown in its normally open position wherein the phantom-line indicated door panel 86 engages head 44 and moves plunger assembly 18 leftwardly to carry the switch contact 46 to a swich opening position away from the contact provided by the conical seat 34.

DETAILED DESCRIPTION OF THE SECOND EMBODIMENT

Figure 7:
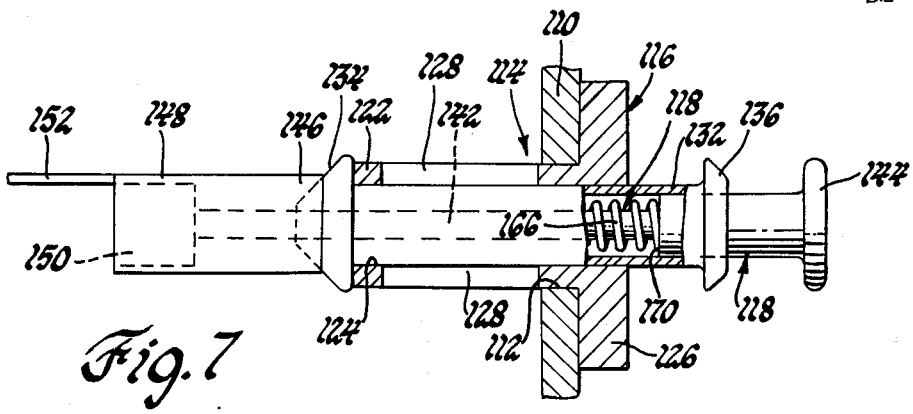
FIG. 7 shows the electrical switch prior to its being mounted on the support.

Referring to FIG. 7, it is seen that a support member or door frame 110 defines an aperture 112. A switch indicated generally at 114 is comprised of a body assembly designated 116 and a plunger assembly designated 118.

The body assembly 116 of the switch assembly 114 includes a sleeve portion 122 having an axially extending bore 124. An annular abutment collar 126 is integrally formed or suitably attached at one end of the sleeve portion 122 and is engageable against a face of the support 110. The sleeve portion 122 has a plurality of circumferentially spaced axial incisions 128 which divide the sleeve portion 122 into a plurality of circumferentially spaced axially extending wall portions 130.

A tubular guide member 132 is received within bore 124 of sleeve portion and has a frictional interference fit therewith. The guide member 132 has a head portion at one end providing a swicth contact conical seat 134 and a flanged head 136 at the other end.

The plunger assembly 118 includes a plunger rod 142 having a head 144 at one end thereof and a switch contact 146 at the other end thereof. The switch contact 146 includes a tubular member 148 which is mounted on the plunger rod 142 by an annular plastic insulating ring 150. The tubular member 148 has an integral connector tang 152 which is adapted to mate with a conventional electrical connector.

Figure 5:
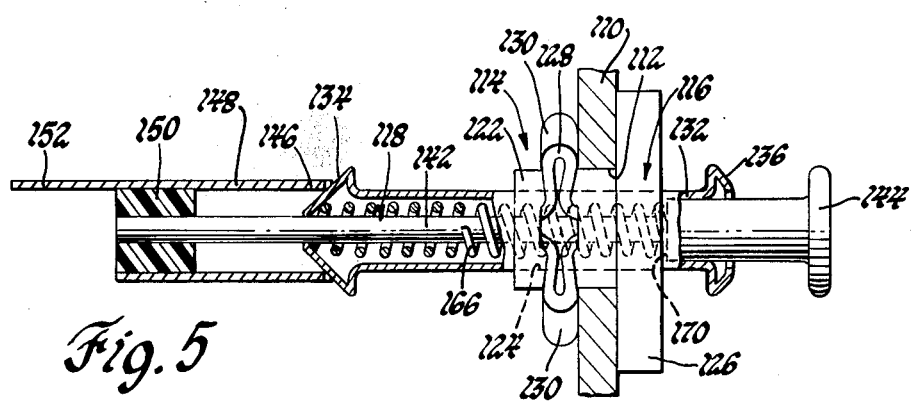
FIG. 5 is a sectional view of a second embodiment of the invention showing the electrical switch mounted on a vehicle body support and poised in the switch closed position when the vehicle door is in open position.

A coil compression spring 166 encircles the plunger rod 142 and has its one end seated against the conical seat 134 of guide member 132. The other end of spring 166 seats against a shoulder 170 of plunger rod 142. As seen in FIG. 5, the spring 166 urges the plunger head 144 rightwardly to carry the tubular member 148 of the switch contact 146 into switch closing engagement with the head portion conical seat 134.

Figure 8:
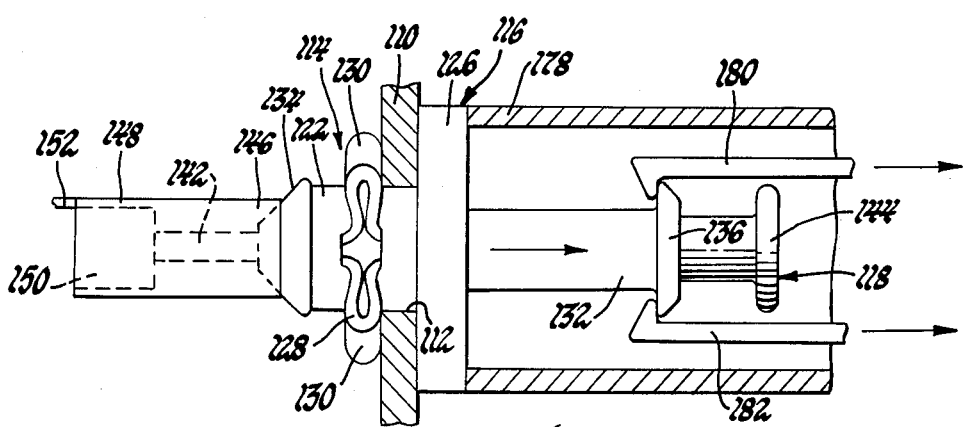
FIG. 8 shows how the electrical switch is mounted on the support.

Comparing FIGS. 7 and 8, it will be seen that the switch assembly 114 is mounted on the support 110 by collapsing the sleeve portion 122 axially which in turns causes radial expansion of the circumferentially spaced axial wall portions 130 as seen in FIG. 8.

As seen in FIG. 8, an assembly tool is fitted over the switch assembly 114 and includes a positioning sleeve 178 and circumferentially spaced gripping jaws 180 and 182. The positioning sleeve 178 seats against the abutment collar 126 to hold the abutment collar 126 in engagement with the face of support 110. The jaws 180 and 182 are power operated for radially inward gripping and rightward movement of the flanged head 136 of guide member 132. Rightward travel of the guide member 132 from its position of FIG. 7 carries the head portion conical seat 134 into engagement with the end of sleeve portion 122. Further rightward movement of the plunger rod 142 causes axial collapse of the sleeve portion 122. The circumferentially spaced axial incisions 128 weaken the sleeve portion 122 so that the circumferentially spaced axial wall portions 130 buckle outwardly in uniform manner to capture the support 110 between the abutment collar 126 and the axial wall portions 130.

Referring to FIG. 5, the completed switch installation is shown. The spring 166 urges the plunger rod 142 rightwardly to carry the tubular member 148 of switch contact 146 into electrically grounded switch closing engagement with the head portion conical seat 134 of guide member 132.

Figure 6:
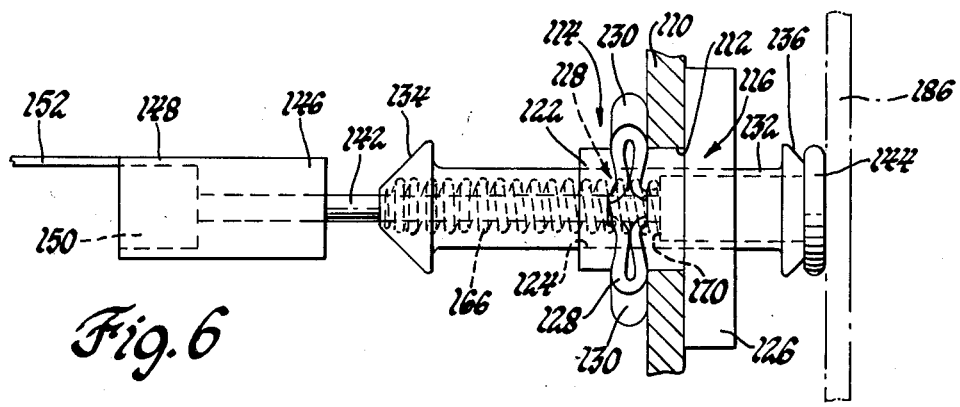
FIG. 6 is a view similar to FIG. 5 but showing the switch poised in the open position when the vehicle door is in the closed position.

Comparing FIGS. 5 and 6, it is seen that closure of the vehicle door causes the phantom-line indicated door panel 186 to engage head 144 and move it leftwardly to engage flanged head 136 of guide member 132 and carry the guide member 132 to a leftwardly adjusted position of FIG. 6 where it is retained by the frictional interference fit with bore 124 of sleeve portion 122. Accordingly, the head portion conical seat 134 is moved further from support 110 to provide an adjusted position of guide member 132 which reduces the extent by which the plunger rod 142 projects beyond the support 110 and compensates for variation in the distance between support 110 and the phantom-line indicated door panel 186.

Thus, it is seen that the invention provides an improved and simplified door operated switch wherein the necessity of a threaded connection with the vehicle door frame is eliminated.

It will be understood that the teachings of this invention have application beyond the example of the door operated switch. For example, the teachings of this invention are applicable to use in any device which is operable by a spring biased plunger. For example, the head 44 of the plunger rod 42 could be a manually actuated push button while the opposite end of the plunger rod could be adapted to operate a seat back latch or other actuatable operating mechanism.

The embodiments of the invention in which an exclusive property or privilege is claimed are defined as follows:

1. An operating mechanism adapted for mounting on an apertured support and operable to effect movement of an actuatable mechanism, said operating mechanism comprising: a tubular body adapted for insertion into the aperture of the support and having an axially extending bore, said body having an abutment portion engageable with one side of the support to limit insertion of the body through the support aperture and a radially expandable and axially collapsible sleeve portion located on the other side of the support, a plunger guide member supported within said bore of said tubular body, a plunger member extending through said guide member, one of said members including a head portion engageable with the end of said sleeve portion of the tubular body opposite the abutment means, means on the other end of said one member for engagement by a tool to move said one member relative to said tubular body and engage said head portion with said end of said body sleeve portion to axially collapse and radially expand said sleeve portion against said opposite side of said support and thereby attach said tubular body to said support, resilient means biasing said plunger member outwardly of said tubular body to an engageable position, stop means locating the plunger member against the bias of the spring means in said engageable position and means operatively connecting the plunger member with the actuatable mechanism.

2. An electrical switch adapted to be mounted on an apertured support for actuation by a door and comprising:
- a tubular body adapted for insertion into the aperture of the support and having an axially extending bore, said body having an abutment portion engageable with one side of the support to limit insertion of the body through the support aperture and an axially collapsible and radially expandable sleeve portion located on the other side of the support;
- a guide member supported for frictional sliding adjustment within said bore of the tubular body and having a head portion at one end forming an electrical contact and being engageable with the end of said sleeve portion of the tubular body opposite the abutment means;
- means on the other end of the guide member for engagement by a tool to engage the head portion with the end of said sleeve portion to axially collapse and radially expand said sleeve portion against the support and thereby attach the tubular body to the support;
- a plunger member extending through the guide member and carrying a switch contact at one end and having a head portion at the other end engageable by the door;
- resilient means biasing said plunger member outwardly of the tubular body to a switch closing position wherein the switch contact engages the guide member contact to limit movement of the plunger member relative the support;
- and said plunger member head portion being engageable with the guide memer upon door actuation of the plunger member to carry the switch contact away from the guide member contact and move the guide member to an adjusted position wherein the guide member contact is positioned further from the support to limit the extent of projection of the plunger member beyond the support in the switch closing position.

3. An operating mechanism adapted for mounting on an apertured support and operable to effect movement of an actuatable mechanism, said operating mechanism comprising:
- a tubular body adapted for insertion into the aperture of the support and having an axially extending bore, said tubular body having an abutment means engageable with the support to limit insertion of the tubular body into the support and a sleeve portion extending on the side of the body member opposite the abutment means and adapted for axial collapse and radial expansion;
- a plunger member extending through the bore of the body member and being axially movable therein;
- a head on one end of the plunger member larger than the bore of the tubular body and engageable with the end of the tubular body sleeve portion opposite the abutment means;
- the other end of the plunger member having a gripping surface adapted for gripping by a tool which forcibly pulls the plunger member to engage the head against the end of the tubular body sleeve portion to collapse the sleeve portion axially and induce radial expansion of the sleeve portion to capture the support between the abutment means and the radially expanded portion of the tubular body and thereby attach the tubular body to the support;
- spring means;
- spring seat means associated with the tubular body and the plunger member and seating the spring means so that the spring means urges movement of the plunger member relative the tubular body;
- stop means acting between the body member and plunger member to limit movement of the plunger by the spring means and thereby define a normal axial position of the plunger member relative the tubular body;
- and means operatively connecting the plunger member with the actuatable mechanism.

4. An electrical switch adapted to be mounted on a support member having an aperture, said switch comprising:
- a body member having a sleeve portion defining an axially extending bore and adapted for insertion through the aperture of the support member and axial collapse and radial expansion; said body member also having an annular collar engageable with the support member to limit insertion of the body member sleeve portion into the support member;
- a plunger member extending through the bore of the body member and being axially movable therein;
- a head on one end of the plunger member larger than the bore of the body member sleeve portion and engageable with the end of the sleeve portion;
- a gripping surface on the end of the plunger member oppositely the head thereof and adapted for gripping by a tool which forcibly pulls the plunger member to engage the head against the end of the sleeve portion causing axial collapse and radial expansion of the sleeve portion to capture the support between the annular collar and the radially expanded sleeve portion whereby the tubular body is permanently attached to the support;
- spring means;
- spring seat means associated with the tubular body and the plunger member and seating the spring means so that the spring means urges movement of the plunger member relative the tubular body;
- stop means acting between the tubular body and plunger member to limit movement of the plunger by the spring means and thereby define a normal axial position of the plunger member relative the tubular body;
- and an electrical switch operably connected to the plunger means for actuation between open and closed positions, said spring biasing the plunger member to one of the switch operating positions and being yieldable to permit the movement of the plunger member axially of the body member to actuate the switch to the other position.

5. An electrical switch adapted to be mounted on a support having an aperture, said switch comprising:
- a tubular body having a sleeve portion defining an axially extending bore and adapted for insertion through the aperture of the support and axial collapse and radial expansion and abutment means on the tubular body engageable with the support to limit insertion of the tubular body sleeve portion into the support;
- a plunger member extending through the bore of the tubular body;
- a head on one end of the plunger member larger than the bore of the tubular body sleeve portion and engageable with the end of the sleeve portion;
- a gripping surface on the end of the plunger member oppositely the head thereof and adapted for gripping by a tool which forcibly pulls the plunger member to engage the head against the end of the sleeve portion causing axial collapse and radial expansion of the sleeve portion to capture the support between the abutment means and the radially expanded sleeve portion whereby the tubular member is permanently attached to the support;
- a first electrical contact on the tubular body;
- a second electrical contact on the plunger member, said second electrical contact on the plunger member being moved between contacting and noncontacting positions relative the first contact member when the plunger member is moved axially of the body member.

* * * * *